(12) United States Patent
Oblizajek et al.

(10) Patent No.: US 7,909,361 B2
(45) Date of Patent: Mar. 22, 2011

(54) VEHICULAR STEERING WHEEL AND COLUMN ASSEMBLY INCLUDING TORSIONAL DAMPER DEVICE

(75) Inventors: Kenneth L. Oblizajek, Troy, MI (US); Carl T. Wright, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 291 days.

(21) Appl. No.: 12/136,676

(22) Filed: Jun. 10, 2008

(65) Prior Publication Data

US 2009/0301803 A1 Dec. 10, 2009

(51) Int. Cl.
*B60R 21/203* (2006.01)
(52) U.S. Cl. ............ 280/731; 280/771; 280/779; 74/492
(58) Field of Classification Search .................. 280/771, 280/731, 89, 90, 779, 780; 74/492
See application file for complete search history.

(56) References Cited

U.S. PATENT DOCUMENTS

| | | | | |
|---|---|---|---|---|
| 3,396,599 | A * | 8/1968 | Altmann | 74/492 |
| 5,538,282 | A * | 7/1996 | White et al. | 280/779 |
| 6,120,046 | A * | 9/2000 | Daly | 280/90 |
| 6,921,066 | B2 * | 7/2005 | Hamada | 267/140.12 |
| 2001/0036760 | A1 * | 11/2001 | Oishi | 439/164 |
| 2002/0152821 | A1 * | 10/2002 | Strothmann | 73/862.332 |
| 2005/0180727 | A1 * | 8/2005 | Yajima et al. | 385/147 |
| 2006/0261587 | A1 * | 11/2006 | Harris et al. | 280/771 |
| 2006/0283271 | A1 * | 12/2006 | Araki et al. | 73/866.5 |
| 2007/0137955 | A1 * | 6/2007 | Maranville et al. | 188/267.2 |
| 2009/0203232 | A1 * | 8/2009 | Ida et al. | 439/15 |

OTHER PUBLICATIONS

BNL (UK) Ltd. "Innovative Bearing Solutions, Clips & Fixings," Feb. 2006; refer to Fig. 2 (steering column sensor bearing with integrated spring and fixing clips); retrieved from the Internet at http://www.bnl-bearings.com/downloads/APPS_9/Clips%20$%20Fixings%20.pdf.

* cited by examiner

*Primary Examiner* — Ruth Ilan
(74) *Attorney, Agent, or Firm* — Ingrassia Fisher & Lorenz, P.C.

(57) ABSTRACT

A steering wheel and column assembly is provided for deployment on a vehicle. In one embodiment, the steering wheel and column assemblies comprises: (i) a steering column housing, (ii) a rotatable steering assembly, and (iii) a torsional damper device. The rotatable steering assembly includes a steering column shaft, which is rotatably coupled to the steering column housing, and a steering wheel, which is fixedly coupled to the steering column shaft. The torsional damper device includes a stator body, which is fixedly coupled to the steering column housing, and a rotor body, which is fixedly coupled to the rotatable steering assembly. The rotor body frictionally engages the stator body to produce a predetermined coulomb torque frictional resistance.

18 Claims, 4 Drawing Sheets

VEHICULAR STEERING WHEEL AND COLUMN ASSEMBLY INCLUDING TORSIONAL DAMPER DEVICE

TECHNICAL FIELD

The present invention generally relates to vehicular steering systems and, more particularly, to a steering wheel and column assembly including a torsional damper device.

BACKGROUND

It is now common for a vehicle's steering wheel to support various electrical devices, such as audio system controls, a horn actuation switch, and a supplemental inflatable restraint (SIR) module. A contact plate may be employed to maintain electrical communication between the vehicle's electrical infrastructure and the audio system controls, the horn actuation switch, and other such steering-wheel mounted inputs. However, an SIR coil assembly is commonly employed to provide a more reliable hardwire connection with the SIR module. A generalized SIR coil assembly includes a stator body, a rotor body, and a flat ribbon cable coiled between the stator body and the rotor body (commonly referred to as an "SIR coil" or a "clock spring roll"). The stator body of the SIR coil assembly is fixedly attached to the steering column housing, and the rotor body is affixed to the steering wheel or the rotatable steering column shaft. As a driver turns the vehicle's steering wheel, the rotor body of the SIR coil assembly rotates relative to the stator body. The coiled ribbon cable furls and unfurls as needed to accommodate this rotational movement.

Vehicular steering wheel and column assemblies have been extensively engineered to provide desirable steering characteristics. Despite this, conventional steering wheel and column assemblies may still permit minor torsional vibrations to be transmitted through the steering column shaft to the steering wheel. Such vibrations may be produced by various periodic sources at the rotating corners of the vehicle (e.g., tires, wheels, brake rotors, bearing hub assemblies, etc.), including such conditions as imbalance and non-uniform tires, and consequently may be produced even when the vehicle is traveling over a relatively smooth road. This vibratory condition is commonly referred to as "smooth road shake" or, more simply, "SRS." In general, SRS may be characterized by the unwanted dynamic rotational movement of the steering wheel at or above thresholds perceptible to a driver; e.g., occurring on the order of a few fractions of a degree (e.g., 1.5 minutes) generally at frequencies ranging from approximately 8 to 20 hertz, especially when the vehicle is operated over a range of speeds of approximately 80 to 160 kilometers per hour. Although this rotational movement is relatively minor, it is readily perceptible to a driver and consequently undesirable. Devices have been produced that attempt to minimize SRS by providing a clamping force around the steering wheel shaft; however, such devices have been limited in various respects. For example, such devices tend to be inherently resilient for small angular displacements and consequently store, rather than dissipate, kinetic energy.

Accordingly, it is desirable to provide a vehicular steering wheel and column assembly including a torsional friction damper that substantially reduces or entirely eliminates the occurrence of SRS. It would also be desirable if, in certain embodiments, the torsional friction damper were integrated into a component, such as an SIR coil assembly, commonly employed in conventional vehicular steering wheel and column assemblies so as to reduce cost and overall part count. Other desirable features and characteristics of the present invention will become apparent from the subsequent detailed description and the appended claims, taken in conjunction with the accompanying drawings and the foregoing technical field and background.

SUMMARY

A steering wheel and column assembly is provided for deployment on a vehicle. In one embodiment, the steering wheel and column assembly comprises: (i) a steering column housing, (ii) a rotatable steering assembly, and (iii) a torsional damper device. The rotatable steering assembly includes a steering column shaft, which is rotatably coupled to the steering column housing, and a steering wheel, which is fixedly coupled to the steering column shaft. The torsional damper device includes a stator body, which is fixedly coupled to the steering column housing, and a rotor body, which is fixedly coupled to the rotatable steering assembly. The rotor body frictionally engages the stator body to produce a predetermined coulomb torque frictional resistance.

A supplemental inflatable restraint (SIR) coil assembly is also provided for deployment within a steering wheel and column assembly of the type that includes a steering column housing, a steering column shaft rotatably coupled to the steering column housing, a steering wheel fixedly coupled to the steering column shaft, and an SIR module mounted on the steering wheel. In one embodiment, the SIR coil assembly includes: (i) a stator body configured to be fixedly coupled to the steering column housing, (ii) a rotor body configured to be fixedly coupled to at least one of the steering wheel and the steering column shaft, and (iii) an SIR coil disposed between the stator body and the rotor body and configured to be electrically coupled to the SIR module. The rotor frictionally engages the stator body to produce a predetermined coulomb torque frictional resistance between approximately 0.1 Newton meters and approximately 0.4 Newton meters

DESCRIPTION OF THE DRAWINGS

The present invention will hereinafter be described in conjunction with the following drawing figures, wherein like numerals denote like elements, and.

DETAILED DESCRIPTION OF AT LEAST ONE EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
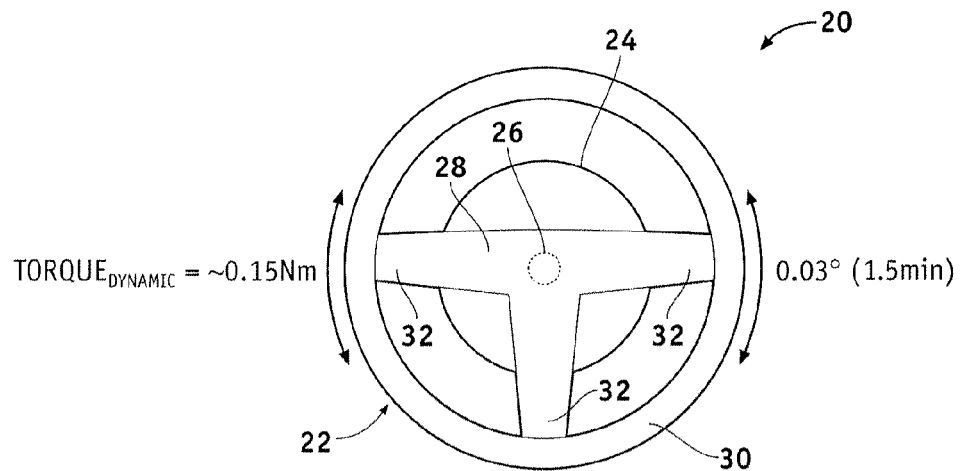
FIG. 1 is a plan view of an exemplary steering wheel and column assembly illustrating the occurrence of smooth road shake with dynamic motions and transmitted torques at thresholds of driver detection.

FIG. 1 is a simplified plan view of a steering wheel and column assembly 20 illustrating the occurrence of smooth road shake (referred to herein as "SRS") with dynamic motions at the threshold of driver detection; e.g., of approximately 1.5 minutes at or near frequencies ranging from approximately 8 to 20 hertz as discussed more fully below. Steering wheel and column assembly 20 includes a steering wheel 22, a steering column housing 24, and a steering column shaft 26 (shown in phantom). Steering column housing 24 is fixedly mounted to a base mounting structure provided on a host vehicle (not shown). Steering wheel 22 includes a steering wheel rim 30 that is connected to a central hub 28 by a plurality of radial spokes 32. Central hub 28 is fixedly coupled to the upper end of steering column shaft 26, which is, in turn, rotatably mounted within steering column housing 24.

During the occurrence of SRS, imbalances internal to the vehicle produce vibrations that are transmitted through steering column shaft 26, through central hub 28, through spokes 32, and to steering wheel rim 30. These vibrations result in the rotational movement of steering wheel rim 30. As indicated in FIG. 1, the rotation displacement of the steering wheel rim 30 may be relatively minimal (e.g., on the order of approximately 0.03 degree) and may be produced by a relatively minor torque exerted about the axis of rotation of steering wheel rim 30 (e.g., on the order of approximately 0.15 Newton meters). This notwithstanding, angular steering wheel displacements on the order of approximately 0.03 degree and larger at frequencies ranging from approximately 8 to 20 hertz have been found to be driver perceptible and are consequently undesirable. The following describes several exemplary embodiments of a steering wheel and column assembly including a torsional damper device that substantially reduces or entirely eliminates the occurrence of SRS.

Figure 2:
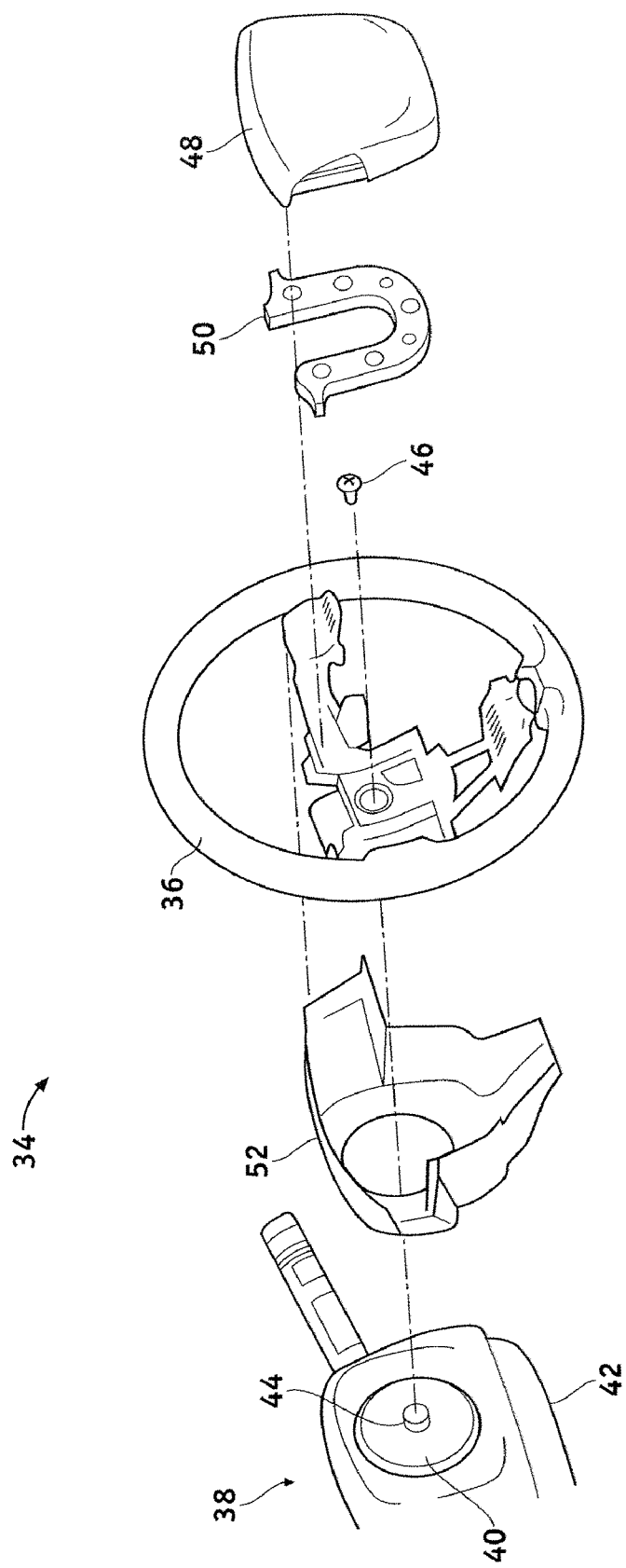
FIG. 2 is an exploded view of a steering wheel and column assembly in accordance with an exemplary embodiment.

FIG. 2 is an exploded view of a portion of a steering wheel and column assembly 34 in accordance with a first exemplary embodiment. Steering wheel and column assembly 34 is similar to assembly 20 described above in conjunction with FIG. 1. For example, steering wheel and column assembly 34 comprises a steering wheel 36 and a steering column 38 (only partially shown in FIG. 2). Steering column 38 includes a stationary steering column housing 42 and a steering column shaft 44, which is rotatably mounted within steering column housing 42. As was the case previously, steering wheel 36 is affixed to the exposed end of steering column shaft 44 utilizing, for example, splined interconnecting features and a locking bolt 46 or other such fastener. Steering wheel and column assembly 34 further includes an SIR module 48 and a horn contact 50, which are each deployed on steering wheel 36; e.g., SIR module 48 may be mounted to the central hub of steering wheel 36 over horn contact 50. A lower cover 52 may also be mounted between steering column 38 and steering wheel 36 as shown in FIG. 2.

When steering wheel 36 is turned by a driver, both steering wheel 36 and steering column shaft 44 rotate relative to steering column housing 42. For this reason, steering wheel 36 and steering column shaft 44 may be collectively referred to as a "rotatable steering assembly" herein. To maintain continuous electrical communication with SIR module 48 during the rotation of steering wheel 36, steering wheel and column assembly 34 is further equipped with an SIR coil assembly 40. SIR coil assembly 40 is mounted to steering column housing 42 and includes a central aperture through which steering column shaft 44 extends. In a preferred group of embodiments, SIR coil assembly 40 also functions as a torsional damper device that substantially reduces or entirely eliminates the occurrence of SRS at steering wheel 36 as described in more detail below in conjunction with FIGS. 3 and 4.

Figure 3:
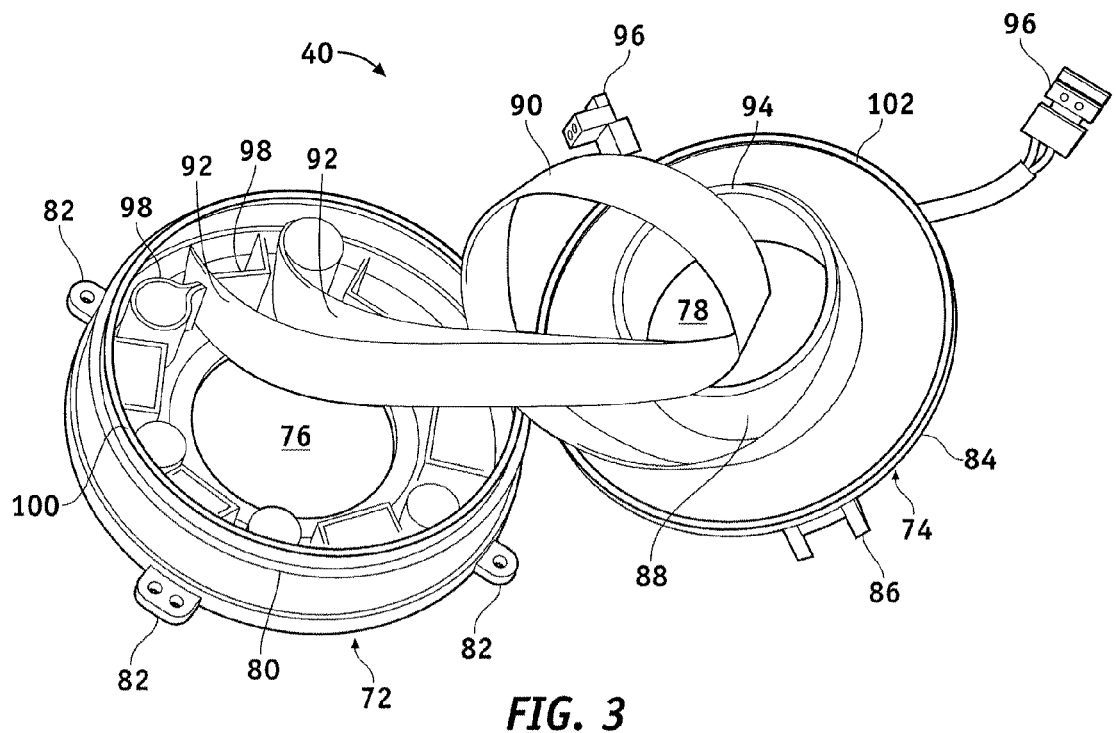
FIG. 3 is a view of the supplemental inflatable restraint (SIR) coil assembly employed in the steering wheel and column assembly shown in FIG. 2.

FIG. 3 is a view of exemplary SIR coil assembly 40 in a disassembled state. In this view, it can be seen that SIR coil assembly 40 comprises a stator body 72 and a rotor body 74. Stator body 72 is generally annular in shape and includes a central aperture 76 therethrough. Similarly, rotor body 74 is generally annular in shape and includes a central aperture 78 therethrough. When SIR coil assembly 40 is assembled, central apertures 76 and 78 align and permit steering column shaft 44 (FIG. 2) to extend through SIR coil assembly 40 to be coupled to steering wheel 36 (FIG. 2) as described above. In addition to aperture 76, stator body 72 further includes a raised annular rim 80 and a plurality of mounting flanges 82 circumferentially spaced about rim 80. Mounting flanges 82 may each receive a threaded fastener to permit stator body 72 to be mounted to steering column housing 42 (FIG. 2). Rotor body 74, by comparison, includes an outer radial lip 84, a single or plurality of projections 86 (one of which is visible in FIG. 3), and an inner annular collar 88 that generally defines central aperture 78. When SIR coil assembly 40 is installed, projections 86 may positively register with mating slots provided on the backside of steering wheel 36 (FIG. 2) to reduce lash between steering rotor body 74 and steering wheel 36. Stator body 72 and rotor body 74 are each preferably formed to exhibit a relatively high predetermined torsional stiffness. In one non-limiting example, stator body 72 and rotor body 74 may each be formed to have a predetermined torsional stiffness between approximately 40 Newton meters per degree and approximately 80 Newton meters per degree.

SIR coil assembly 40 further comprises an elongated electrical conductor 90, which, in the example shown in FIG. 3, assumes the form of a flat ribbon cable. Electrical conductor 90 is physically coupled between stator body 72 and rotor body 74. More specifically, a first bifurcated end portion 92 of electrical conductor 90 is attached to the interior of stator body 72, and a second opposing end portion 94 of conductor 90 is attached to the interior of rotor body 74. When SIR coil assembly 40 is assembled, electrical conductor 90 is generally contained within an inner annulus defined, in large part, by the inner surface of raised annular rim 80 and the outer surface of inner annular collar 88. Electrical conductor 90 is electrically coupled between the electrical infrastructure of a host vehicle (not shown) and SIR module 48 mounted on steering wheel 36 (FIG. 2). To permit electrical conductor 90 to be electrically coupled to SIR module 48 (FIG. 2), SIR coil assembly 40 is further provided with one or more electrical connectors suitable for interfacing with SIR module 48. For example, and as shown in FIG. 3, SIR coil assembly 40 may include first and second male plugs 96, which are electrically coupled to conductor 90 and which may be matingly received by female sockets provided on SIR module 48 (FIG. 2).

During operation, as a driver turns steering wheel 36, rotor body 74 may make several complete rotations relative to stator body 72. Elongated electrical conductor 90 is generally spiraled or coiled and may furl and unfurl as needed to accommodate this rotational movement. Furthermore, in preferred embodiments, electrical conductor 90 exhibits a spring-like resiliency and thus readily returns to its original shape and position after deformation. For this reason, electrical conductor 90 is commonly referred to as a "SIR coil" or a "clock spring roll." To help guide the movement of electrical conductor 90 as rotor body 74 rotates relative to stator body 72, stator body 72 may be equipped with one or more guide features, such as ribbon electrical conductor roller guides 98 disposed on an inner surface of raised annular rim 80 as shown in FIG. 3. In addition, inner annular collar 88 may serve as a mandrel around which electrical conductor 90 may freely wind and unwind.

When SIR coil assembly 40 is assembled, stator body 72 resides adjacent rotor body 74 and at least one surface of stator body 72 frictionally engages at least one surface of rotor body 74. In the illustrated example shown in FIG. 3, a first friction surface 100 provided on raised annular rim 80 frictionally engages a second friction surface 102 provided on outer radial lip 84. Collectively, friction surfaces 100 and 102 may be referred to as the "friction interface" of SIR coil assembly 40. Friction surfaces 100 and 102 have similar dimensions and are each substantially annular in shape; thus, the friction interface of SIR coil assembly 40 is also generally annular in shape. It may also be noted that, in this exemplary case, the plane of the annular friction interface is substantially orthogonal to the longitudinal axis of steering column shaft 44 (FIG. 2).

Figure 4:
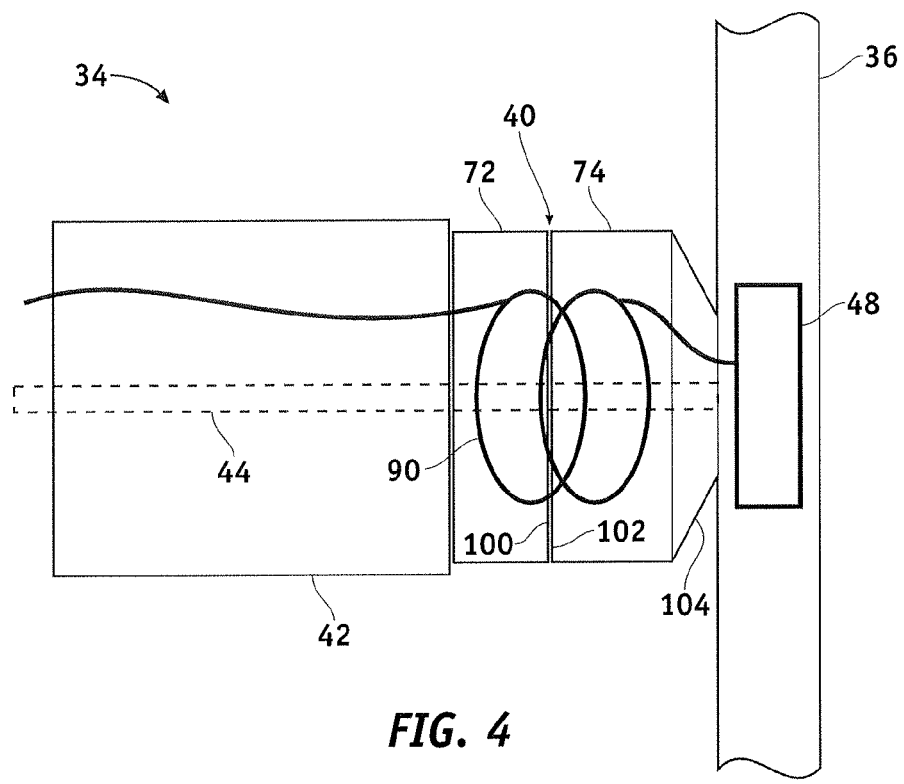
FIG. 4 is a side functional view of the steering wheel and column assembly shown in FIG. 2.

FIG. 4 is a simplified functional side view of steering wheel and column assembly 34. In this view, it can be seen that rotor body 74 includes a domed end portion 104, which is integrally formed with the main body of rotor body 74. Domed end portion 104 is an axially resilient structure that is compliant in a direction substantially normal to the friction interface formed by friction surfaces 100 and 102. When steering wheel and column assembly 34 is assembled, domed end portion 104 abuts, and is deformed by, steering wheel 36. Rotor body 74 is consequently biased toward stator body 72, and friction surface 100 and friction surface 102 are pressed into frictional engagement. In this manner, domed end portion 104 provides an axial compliancy that compensates for wear that may occur over the lifetime of steering wheel and column assembly 34. Of course, alternative embodiments of SIR coil assembly 40 may employ other axially resilient, and in certain cases radially resilient, elements suitable for biasing the friction surface of rotor body 74 toward the friction surface of rotor body 74. An example of such an alternative biasing means is discussed below in conjunction with FIG. 5. Although SIR coil assembly 40 may employ a resilient element compliant in a direction normal to the friction interface, it will be remembered that stator body 72 and rotor body 74 are each formed to have a relatively high torsional stiffness and, thus, exhibits little to no torsional resiliency.

SIR coil assembly 40 is generally designed such that the coulomb frictional force between friction surfaces 100 and 102 is significant enough to substantially reduce angular displacements of steering wheel 36 (FIG. 2) caused by small dynamic torques transmitted through steering column shaft 44 (FIG. 2). At the same time, SIR coil assembly 40 is preferably designed such that the coulomb frictional force between friction surfaces 100 and 102 is small enough to be virtually undetectable by a driver as he or she turns steering wheel 36 (FIG. 2). Stated differently, SIR coil assembly 40 is configured such that stator body 72 frictionally engages rotor body 74 to produce a predetermined coulomb torque frictional resistance. In a preferred group of embodiments, the predetermined coulomb torque frictional resistance is between approximately 0.1 Newton meters and approximately 0.4 Newton meters; and, in a more preferred group of embodiments, the predetermined coulomb torque frictional resistance is between approximately 0.15 Newton meters and approximately 0.25 Newton meters.

As will readily be appreciated by the skilled artisan, the coulomb frictional force occurring at the frictional interface of SIR coil assembly 40 will depend upon a number of different parameters. For example, the magnitude of the axial load urging stator body 72 toward rotor body 74 will have a direct bearing on the coulomb torque frictional force ultimately generated between friction surfaces 100 and 102. In certain embodiments, this axial load may be adjusted utilizing a threaded jackscrew or similar device. The coulomb frictional force at the friction interface will also be determined, in part, by the dimensions of the friction interface. For an annular friction interface, it is generally desirable to optimize the inner diameter of the interface while preventing the overall package of SIR coil assembly 40 (or other torsional damper device) from becoming unwieldy. As a non-limiting example, the friction interface of SIR coil assembly 40 may have an inner diameter between approximately 70 millimeters and approximately 110 millimeters. The column frictional force will still further be influenced by the materials selected for friction surfaces 100 and 102. The materials selected for friction surfaces 100 and 102 may differ from the material from which other portions of stator body 72 and rotor body 74 are formed. Furthermore, the material selected for friction surface 100 may differ from the material selected for friction surface 100; indeed, it is generally preferred that different materials are selected for friction surfaces 100 and 102 to minimize the likelihood of surface-to-surface fusion.

Figure 5:
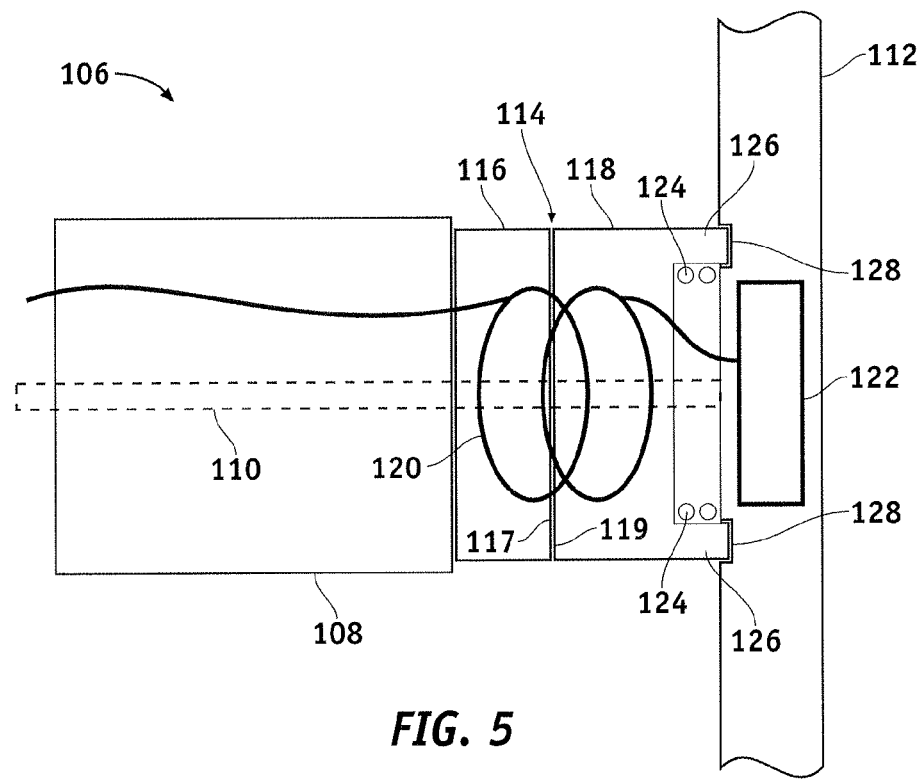
FIG. 5 is a side functional view of a steering wheel and column assembly in accordance with a further exemplary embodiment.

As stated above, it is preferred that stator body 72 and rotor body 74 are biased toward each other by a resilient element. In the above-described embodiment, the resilient biasing element assumes the form of an axially-compressible domed end portion 104 of rotor body 74. However, in alternative embodiments, other types of resilient biasing elements may be employed, including various types of springs (e.g., a coil spring, a bellville washer, a wave spring, etc.). Further emphasizing this point, FIG. 5 is a simplified functional side view of a steering wheel and column assembly 106 including a steering column housing 108, a steering column shaft 110 rotatably mounted within housing 108, and a steering wheel 112 fixedly mounted to an end of steering column shaft 110. An SIR coil assembly 114 is disposed between steering column housing 108 and steering wheel 112. SIR coil assembly 114 includes a stator body 116 fixedly coupled to steering column housing 108, a rotor body 118 fixedly coupled to steering wheel 112, and an elongated conductor 120 (e.g., a coiled ribbon cable) disposed between stator body 116 and rotor body 118 and electrically coupled to an SIR module 122 mounted on steering wheel 112. As was the case previously, stator body 116 and rotor body 118 include first and second annular friction surfaces 117 and 119, respectively. Friction surface 117 frictionally engages friction surface 119 to create an annular friction interface, the plane of which is substantially orthogonal to the longitudinal axis of steering column shaft 110. During operation, SIR coil assembly 114 functions as a torsion damper device that reduces or eliminates the occurrence of SRS in the manner described above.

Referring still to the exemplary embodiment shown in FIG. 5, a coiled spring 124 is disposed around shaft 110 and compressed between rotor body 118 and steering wheel 112. Coil spring 124 biases rotor body 118 toward stator body 116 to help maintain the desired friction characteristics between friction surface 119 of rotor body 118 and friction surface 117 of stator body 116. As indicated in FIG. 5, coil spring 124 may be further retained by first and second projections 126 extending axially from rotor body 118. Projections 126 may be matingly received by corresponding slots 128 provided in the backside of steering wheel 112 to substantially reduce or entirely eliminate torsional lash between rotor body 118 and steering wheel 112. Again, rotor body 118 and stator body 116 are each preferably formed to have a relatively high torsional stiffness.

There has thus been described two exemplary embodiments of a vehicular steering wheel and column assembly that includes a torsional friction damper suitable for reducing or eliminating the occurrence of SRS. In both of the above-described embodiments, the torsional friction damper is integrated into an SIR coil assembly and includes an annular friction interface transected by a plane substantially orthogonal to the longitudinal axis of the steering column shaft. However, in alternative embodiments, the torsional friction damper need not be integrated into an SIR coil assembly, but may instead comprise an independent structural device, such as a pair of friction discs. In addition, the friction interface may assume other shapes and configurations. For example, the friction interface may be generally tubular in shape as described below in conjunction with FIG. 6.

Figure 6:
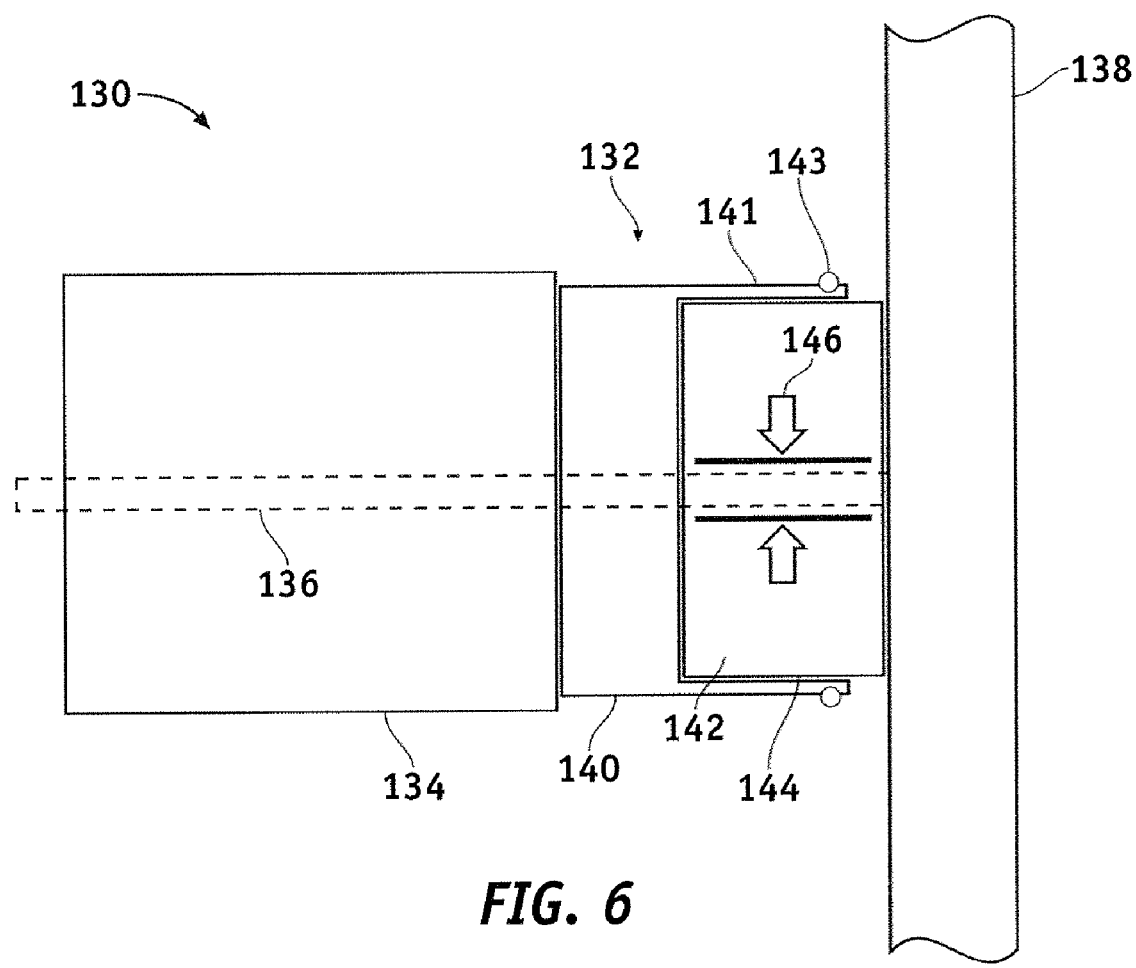
FIG. 6 is a side functional view of a steering wheel and column assembly in accordance with a still further exemplary embodiment.

FIG. 6 is a simplified functional side view of a steering wheel and column assembly 130, which includes a torsional damper device 132, in accordance with a further exemplary embodiment of the present invention. With the exception of torsional damper device 132, the components of steering wheel and column assembly 130 are similar to those employed by assembly 34 (FIGS. 2-4) and assembly 106 (FIG. 5). For example, steering wheel and column assembly 130 includes a steering column housing 134, a steering column shaft 136 rotatably mounted within housing 134, and a steering wheel 138 affixed to an end of steering column shaft 136. Torsional damper device 132, however, differs from the above-described torsional damper devices in several manners. First, torsional damper device 132 is not integrated into, or does not assume the form of, an SIR coil assembly. Second, torsional damper device 132 comprises a stator body 140 and a rotor body 142 that cooperate to form a substantially tubular friction interface 144. More specifically, stator body 140 includes a number of circumferentially-spaced slotted extensions or fingers 141 that extend axially and receive rotor body 142 therebetween. Along their inner surfaces, fingers 141 frictionally engage the outer annular surface of rotor body 142 to form tubular friction interface 144 that is substantially coaxial with steering column shaft 136. During operation, friction interface 144 serves to dampen vibrations transmitted through shaft 136 to reduce or prevent the occurrence of SRS in the previously described manner. If desired, a resilient element 143, such as an elastic ring, may be disposed around fingers 141 (e.g., element 145 may seat in a circumferential groove as shown in FIG. 6) and bias fingers 141 radially inward toward the outer surface of rotor body 142. Again, although compliant in the radial direction, fingers 141, and more generally stator body 140 and rotor body 142, are formed to have a relatively high torsional stiffness; e.g., fingers 141 may be formed from an alloy or metal, such as steel. Finally, torsional damper device 132 differs from the above-described torsional damper devices in that rotor body 142 is not directly connected to steering wheel 138; instead, an inner surface of rotor body 142 contacts and exerts a clamping force around an outer surface of steering column shaft 136 (e.g., rotor body 142 may be crimped over shaft 136) as generally indicated in FIG. 6 at 146.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A steering wheel and column assembly for deployment on a vehicle, the steering wheel and column assembly comprising:
   a steering column housing;
   a rotatable steering assembly, comprising:
      a steering column shaft rotatably coupled to the steering column housing; and
      a steering wheel fixedly coupled to the steering column shaft; and
   a torsional damper device, comprising:
      a stator body fixedly coupled to the steering column housing;
      a rotor body fixedly coupled to the rotatable steering assembly, the rotor body frictionally engaging the stator body to produce a predetermined coulomb torque frictional resistance; and
      a resilient element contacting at least one of the rotor body and the stator body to bias the rotor body and the stator body toward each other.

2. A steering wheel and column assembly according to claim 1 wherein the steering column shaft extends through the stator body.

3. A steering wheel and column assembly according to claim 2 wherein the steering column shaft extends through the rotor body.

4. A steering wheel and column assembly according to claim 1 wherein the rotor body frictionally engages the stator body along an annular friction interface.

5. A steering wheel and column assembly according to claim 4 wherein the plane of the annular friction interface is substantially orthogonal to the longitudinal axis of the steering column shaft.

6. A steering wheel and column assembly according to claim 4 wherein the inner diameter of the substantially annular friction interface is between approximately 70 millimeters and approximately 110 millimeters.

7. A steering wheel and column assembly according to claim 1 wherein the rotor body frictionally engages the rotor body along a tubular friction interface.

8. A steering wheel and column assembly according to claim 7 wherein the tubular friction interface is substantially coaxial with the steering column shaft.

9. A steering wheel and column assembly according to claim 1 further comprising:
   a supplemental inflatable restraint (SIR) module mounted on the steering wheel; and
   an elongated electrical conductor electrically coupled to the SIR module and residing between the stator body and the rotor body.

10. A steering wheel and column assembly according to claim 9 wherein the elongated electrical conductor is substantially contained within the torsional damper device.

11. A steering wheel and column assembly according to claim 1 wherein the resilient element is integrally formed with the rotor body.

12. A steering wheel and column assembly according to claim 1 wherein the rotor body frictionally engages the stator body along a friction interface plane, and wherein the resilient element is compliant in a direction normal to the plane of the friction interface.

13. A steering wheel and column assembly according to claim 1 wherein the resilient element comprises a spring disposed between the rotor body and the steering wheel.

14. A steering wheel and column assembly according to claim 1 wherein the predetermined coulomb torque frictional resistance is between approximately 0.1 Newton meters and approximately 0.4 Newton meters.

15. A steering wheel and column assembly according to claim 1 wherein the predetermined coulomb torque frictional resistance is between approximately 0.15 Newton meters and approximately 0.25 Newton meters.

16. A steering wheel and column assembly, comprising:
   a steering column housing;
   a rotatable steering assembly, comprising:
      a steering column shaft rotatably coupled to the steering column housing; and
      a steering wheel fixedly coupled to the steering column shaft; and
   a torsional damper device, comprising:
      a stator body fixedly coupled to the steering column housing, the stator body having a first predetermined torsional stiffness;
      a rotor body fixedly coupled to the rotatable steering assembly, the rotor body having a second predetermined torsional stiffness; and
      a resilient element maintaining the stator body and the rotor body in frictional engagement.

17. A steering wheel and column assembly according to claim 16 wherein the first predetermined torsional stiffness and the second predetermined torsional stiffness are each between approximately 40 Newton meters per degree and approximately 80 Newton meters per degree.

18. A supplemental inflatable restraint (SIR) coil assembly for deployment within a steering wheel and column assembly of the type that includes a steering column housing, a steering column shaft rotatably coupled to the steering column housing, a steering wheel fixedly coupled to the steering column shaft, and an SIR module mounted on the steering wheel, the SIR coil assembly comprising:
   a stator body configured to be fixedly coupled to the steering column housing comprising a raised annular rim;
   a rotor body configured to be fixedly coupled to at least one of the steering wheel and the steering column shaft, the rotor body comprising an outer radial lip frictionally engaging the raised annular rim to produce a predetermined coulomb torque frictional resistance between approximately 0.1 Newton meters and approximately 0.4 Newton meters; and
   an SIR coil disposed between the stator body and the rotor body and configured to be electrically coupled to the SIR module.

\* \* \* \* \*